Sept. 29, 1959 T. S. ASHE ET AL 2,906,839

THERMALLY OPERATED ELECTRIC SWITCH DEVICES

Filed Sept. 19, 1957 7 Sheets-Sheet 1

INVENTORS
THOMAS STUART ASHE
PETER LINTON
Norris & Bateman
ATTORNEYS

THERMALLY OPERATED ELECTRIC SWITCH DEVICES

INVENTORS
THOMAS STUART ASHE
PETER LINTON
Morris & Bateman
ATTORNEYS

Sept. 29, 1959 T. S. ASHE ET AL 2,906,839

THERMALLY OPERATED ELECTRIC SWITCH DEVICES

Filed Sept. 19, 1957 7 Sheets-Sheet 3

INVENTORS
THOMAS STUART ASHE
PETER LINTON
Norris & Bateman
ATTORNEYS

Sept. 29, 1959 T. S. ASHE ET AL 2,906,839

THERMALLY OPERATED ELECTRIC SWITCH DEVICES

Filed Sept. 19, 1957 7 Sheets-Sheet 4

INVENTORS
THOMAS STUART ASHE
PETER LINTON
Norris & Bateman
ATTORNEYS

INVENTORS
THOMAS STUART ASHE
PETER LINTON
Morris & Bateman
ATTORNEYS

INVENTORS
THOMAS STUART ASHE
PETER LINTON
Morris & Bateman
ATTORNEYS

Sept. 29, 1959 T. S. ASHE ET AL 2,906,839

THERMALLY OPERATED ELECTRIC SWITCH DEVICES

Filed Sept. 19, 1957 7 Sheets-Sheet 7

INVENTORS

THOMAS STUART ASHE

PETER LINTON

Norris & Bateman

ATTORNEYS

United States Patent Office 2,906,839
Patented Sept. 29, 1959

2,906,839

THERMALLY OPERATED ELECTRIC SWITCH DEVICES

Thomas Stuart Ashe, Sawbridgeworth, near Bishops Stortford, and Peter Linton, Harlow, England, assignors to Sunvic Controls Limited, London, England, a British company Application September 19, 1957, Serial No. 684,894

Claims priority, application Great Britain September 24, 1956

22 Claims. (Cl. 200—138)

Figure 1:
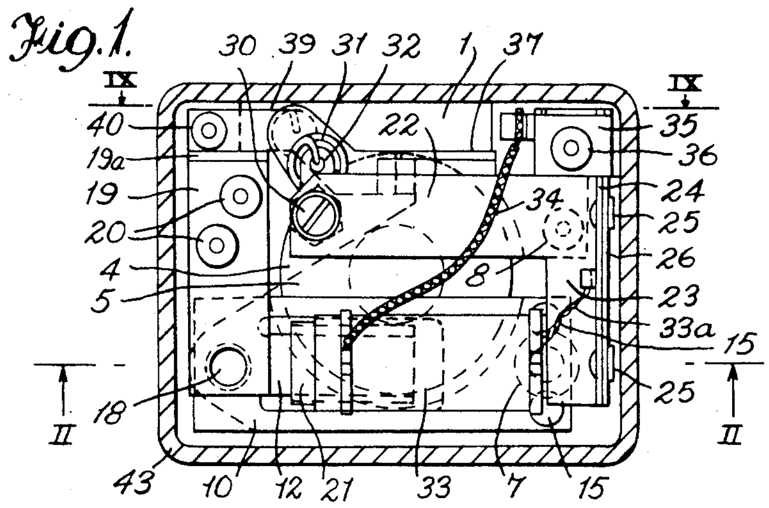

This invention relates to thermally operated electric switch devices of the kind comprising a bi-metal element adapted to be heated electrically to cause operation of the device, and in which the device is compensated for variations of ambient temperature. The ambient temperature compensation may be provided by means of a second bi-metal element similar to the electrically heated element, but not directly subject to the same heating, the switch being operated in dependence on the difference between the deflections of the two bi-metal elements. The latter are commonly of simple strip form. In such arrangements it is necessary to provide means mechanically connecting the bi-metal elements together or otherwise arranging that their differential movement shall be imparted to the switch contacts and the accuracy of temperature compensation is dependent upon the characteristics of the two bi-metal elements being matched to one another. It is necessary, therefore, that the bi-metal strips be manufactured or selected to comparatively close tolerances in thickness and flexivity in order that a sufficiently high standard of compensation shall be achieved.

Such thermally operated devices comprise over current relays, time delay relays, and energy regulators, for example, of the character claimed in British Letters Patent No. 517,538.

According to the present invention in a temperature compensated thermally operable electric switch device the operating element and temperature compensating element are provided by two independently deflectable parts of a single element, said parts being formed integrally from a common piece of bi-metal material with said first and second parts connected at heat deflectable points thereof respectively with an adjustable abutment and with the switch whereby to produce a switch operating force in accordance with the differential deflections of said two parts and the position of said abutment. The element is mounted in the device by means locating a part thereof at which said first two parts are connected with one another for movement of the first and second parts about a common axis, said parts extending to the same side as said common axis to said points thereof producing the switch operating force. Preferably said parts of the element extend in or substantially in the same general plane as one another and the first and second parts preferably comprise a V- or U-shaped formation, that is to say are of strip form united at adjacent ends with one another and conveniently parallel with one another, although they may be divergent or otherwise arranged with respect to one another.

By means of the invention, the first and second parts of the bi-metal element will have substantially the same characteristics, since they are formed integrally from a single piece of bi-metal material, whilst the arrangement is also advantageous in reducing the number of parts required and the time required for assembly of the switch device. Preferably the bi-metal element is of rectilinear U-shape, although other arrangements are possible. According to a further feature of the invention the bi-metal element is located by a flexible metal or other member allowing a hinging action of the bi-metal element as a whole whilst the first and second parts thereof will deflect differentially in accordance with the temperatures thereof.

The invention is applicable generally to thermally operated switch devices of any type, but according to a further feature of the invention the bi-metal element as above defined is employed in an energy regulator, one of said parts of the bi-metal element carrying a heating winding or has associated therewith a heating element or being otherwise arranged for electrical heating, such as by itself carrying a heating current with the free ends of said parts co-operating respectively with a moving contact of the switch and with an adjusting device, the latter conveniently comprising a cam adapted to be rotated by an operating knob or the like to determine the setting of the regulator.

According to a still further feature of the invention, an electrical energy regulator having a bi-metal element arranged as just above set forth, comprises a base structure having an operating shaft journalled therein, said operating shaft carrying a face-cam connected by a cam-follower member with the free end of one of the said parts of the bi-metal element, the latter being arranged generally in a plane perpendicular or substantially perpendicular to the axis of said shaft, and a snap-action switch being mounted on said base structure for movement of the moving contact thereof in, or substantially in, a plane perpendicular to said first plane, the moving contact member of said switch being connected with the free end of the other of said first parts of the bi-metal element. Preferably the moving contact member is carried by a base plate forming part of said structure and includes snap-action means, whilst the bi-metal element is secured at said common part connecting the first and second parts together to said base member, preferably by a flexible metal or other member as hereinbefore indicated. In a convenient arrangement the base structure comprises an insulating block or other member to which the various metal parts are secured with the switch parts located between said block or other base member and the bi-metal element, and the cam is mounted, such as in a recess in said base block to that side of the switch parts remote from the bi-metal element; the operating shaft extends through said base block or other member on the side thereof remote from the switch parts and the bi-metal element. By this means an energy regulator of small size and reduced manufacturing costs and having a desirably high standard of accuracy can be obtained. The arrangement is also well adapted to provide a minimum output of the energy regulator which is a small percentage of the full rating thereof, that is to say the ratio of on-to-off time of the contacts can be reduced to a small percentage. Such large range of regulation is desirable in order that the power input to hot-plates of high ratings can be reduced to low values such as are appropriate for simmering.

The invention also comprises other features as will hereinafter appear and as are set forth in the appended claims.

Reference will now be made by way of example to the accompanying drawings.

In the drawings

Figure 2:
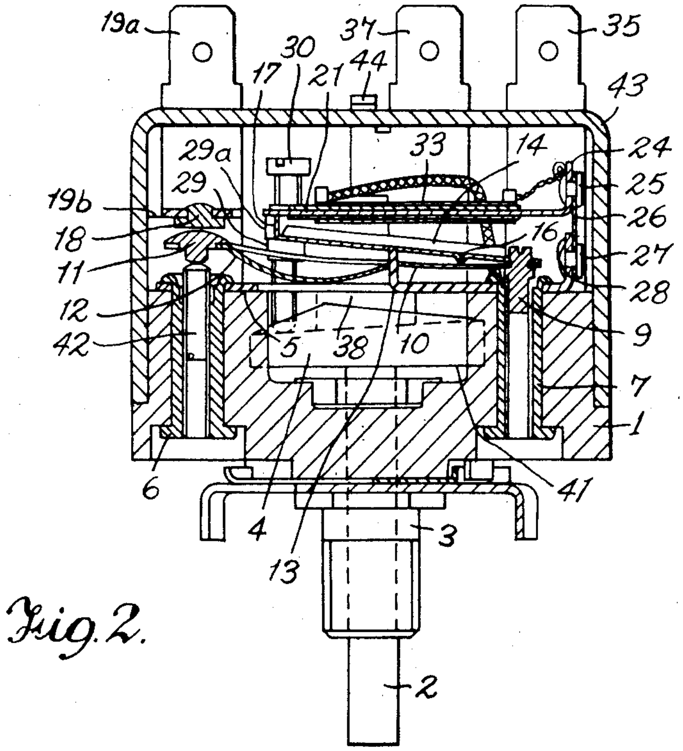

Fig. 1 is a rear plan view of one embodiment of energy regulator according to the invention, Fig. 2 is a sectional plan taken on the line II—II of Fig. 1, Figs. 3 to 6 are views of details of the regulator of Figs. 1 and 2, as will hereinafter be described.

Figure 7:
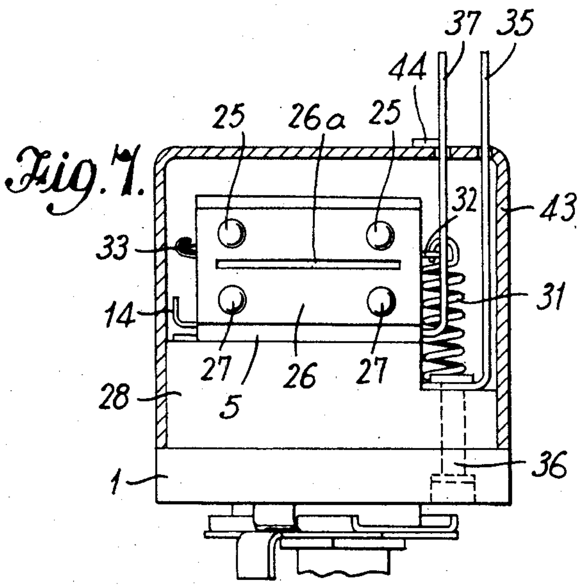
Figure 8:
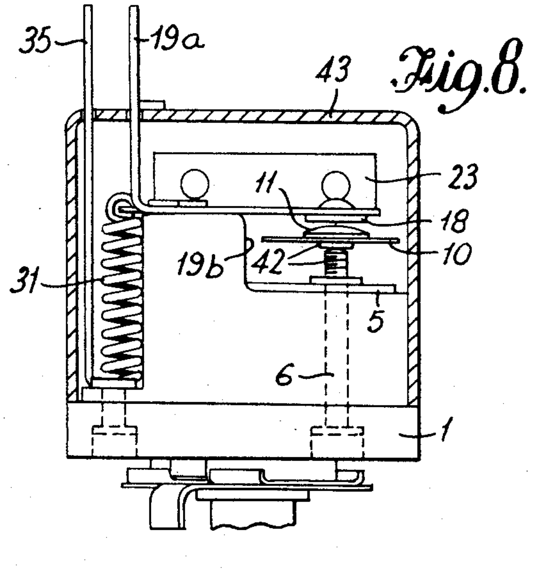
Figure 9:
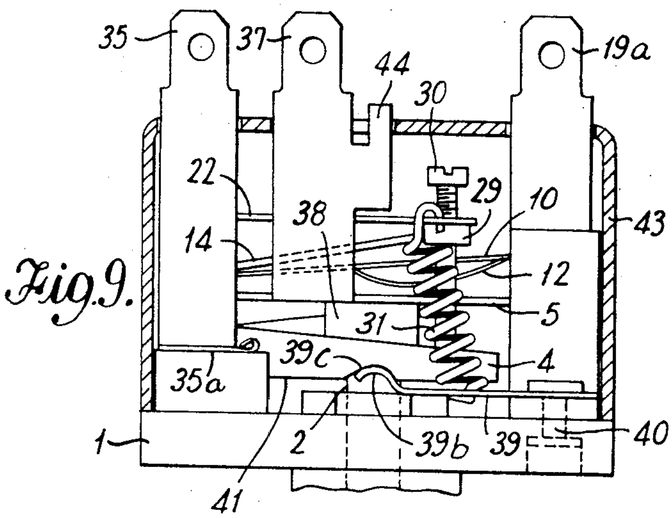
Figure 10:
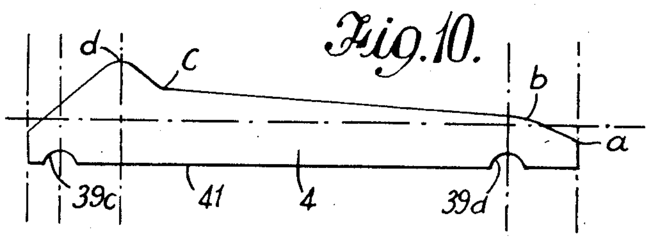
Figures 18, 19:
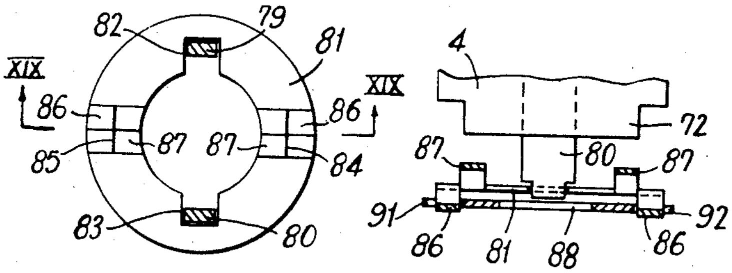
Figure 11:
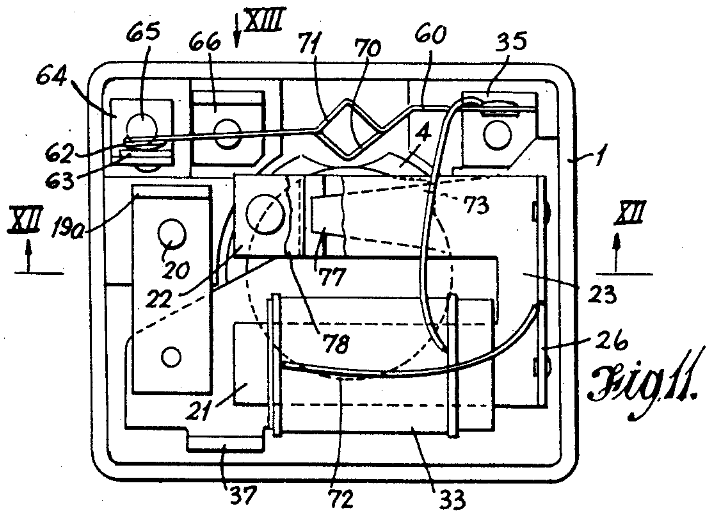
Figure 12:
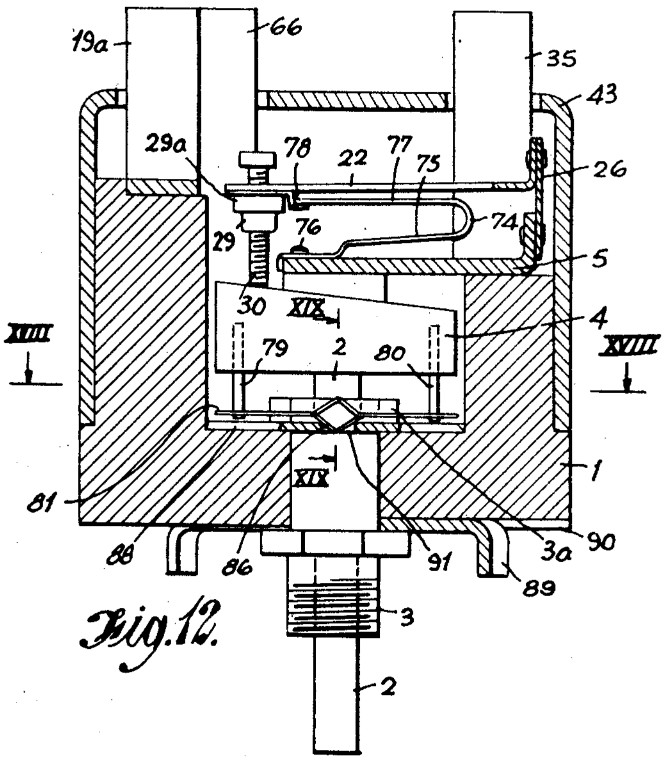
Figures 13, 14:
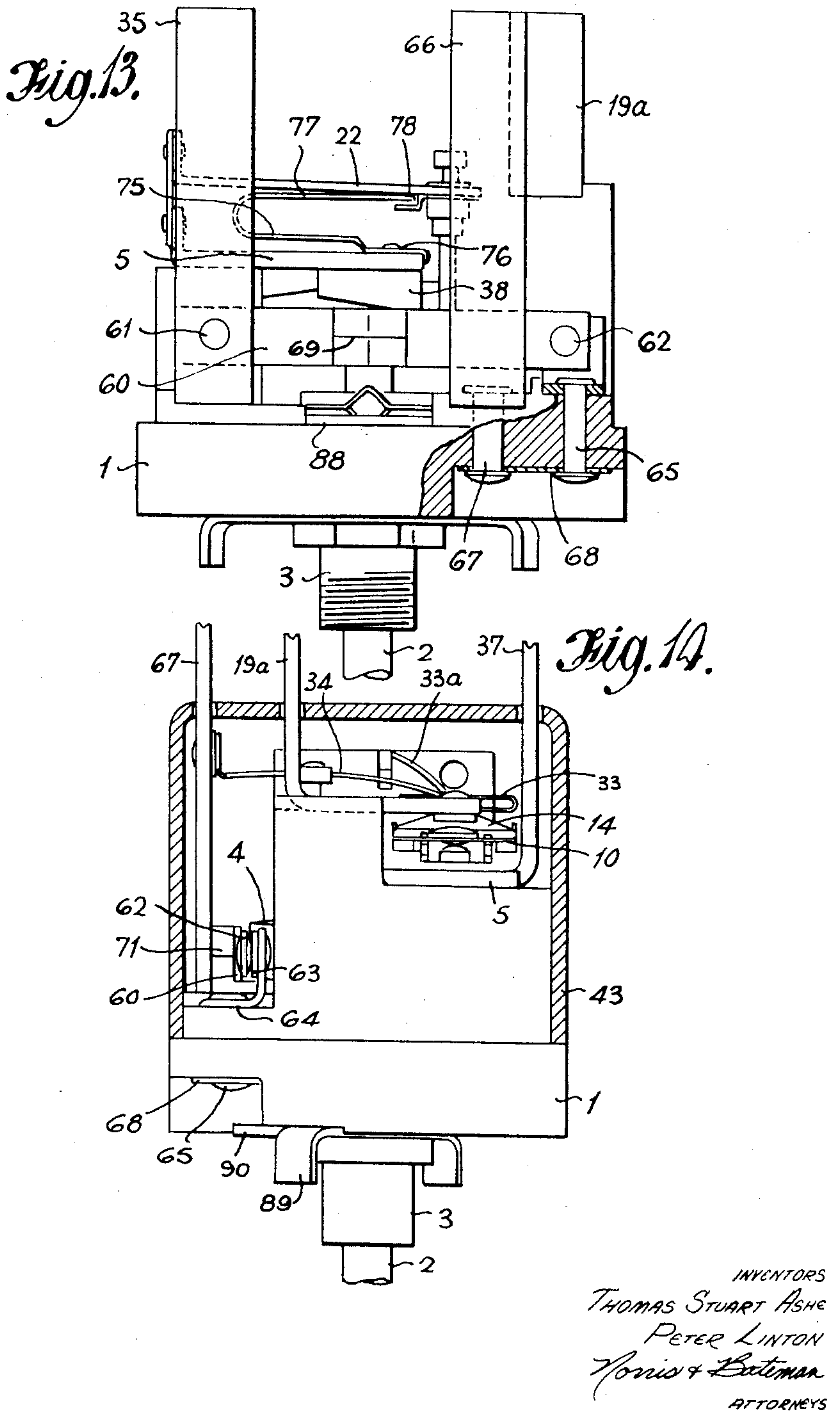

Figs. 7 and 8 are respectively end elevations (partly fragmentary) of the device of Figs. 1 and 2, taken from right hand and left hand, respectively, of Fig. 2, Fig. 9 is a sectional elevation (partly fragmentary) taken in the direction of the arrow IX of Fig. 1, Fig. 10 is a diagram illustrating a preferred form of cam employed in the regulator of the preceding figures and showing the cam in development, Fig. 11 is a rear plan view of a modified form of the regulator shown in the preceding figures, Fig. 12 is a sectional elevation taken on the line XII—XII of Fig. 11, Fig. 13 is an elevation taken in the direction of the arrow XIII of Fig. 11, Fig. 14 is an end elevation taken from the left hand of Fig. 11, Figs. 15, 16 and 17 are electrical circuit diagrams showing the connections of regulators according to the preceding figures, as will hereinafter be described, and Figs. 18 and 19 show a detail.

Similar parts in the several figures are denoted by like reference numerals.

Referring first to Figs. 1, 2, 7, 8 and 9, the device therein shown comprises a ceramic or other insulating base block 1, having an operating shaft 2 mounted therein by means of a metal bush 3. This shaft has made fast to the inner end thereof a face-cam 4, conveniently of moulded insulating material.

Figure 3:
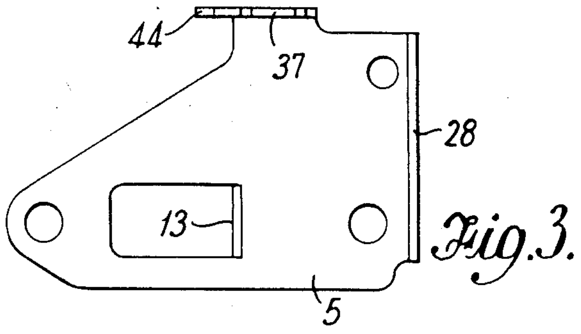

The various moving parts of the device, as will hereinafter be described, are mounted on a metal switch base-plate 5, which is secured to the base 1 by three tubular rivets 6, 7 and 8, this switch plate being of the shape shown in Fig. 3. The bore of the rivet 7 is screw-threaded and receives therein a screw 9, the head of which extends through a perforation in a spring blade 10, the edge of said perforation being received in a groove in the head of the screw 9. The spring blade carries a moving contact 11 and is formed with a curved tongue 12 which engages at its end in a groove formed on a lug 13 up-standing from the plate 5. A switch operating lever 14 of pressed sheet metal is secured to the blade 10 by rivets 15 (Fig. 1), and is formed with a dimple 16 which engages with the spring blade. One end of the lever 14 is upturned at 17 (Figs. 2 and 9) for engagement by the bi-metal assembly hereinafter to be described. Certain parts of the switch have been omitted from Fig. 8 in the interests of clarity.

The arrangement of the switch blade 10 and the lever 14 is in accordance with British Letters Patent No. 585,972 and United States Patent No. 2,776,352.

The moving contact 11 co-operates with a fixed contact 18 which is carried by a strip metal member 19 secured to a step **19*b* of the base 1, such as by rivets 20. This strip metal member is provided with an upturned end part 19*a*** constituting one terminal of the device.

Figure 4:
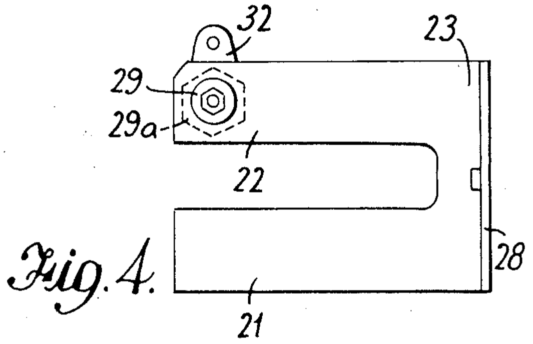
Figure 5:
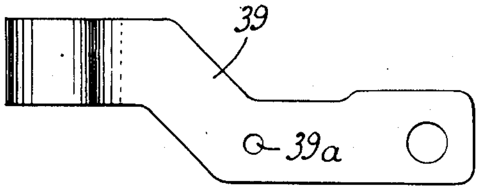

The device is operated by a bi-metal element of U shape, comprising a pair of limbs 21 and 22 (Figs. 1 and 2), and a bight portion 23, this element being shown separately in Fig. 4. The bight portion 23 is flanged at 24, this flange being secured (see Figs. 1, 2 and 7), such as by rivets 25, to a flexible metal strip 26 which is also secured, such as by rivets 27, to a flange 28 formed on the switch base plate 5. As can be seen from Fig. 7, the strip 26 may be slotted at **26*a*** to increase its flexibility along one axis thereof.

The limb 21 engages at its free end with the portion 17 of the switch operating lever 14 (see particularly Fig. 2), whilst the free end of the limb 22 has a bush 29 (see Figs. 2 and 9) riveted in a perforation therein, said bush being internally screw-threaded and receiving a screw 30 which has a domed end engaging with the face of the cam 4.

A tension spring 31 (Figs. 1, 6 and 9), is connected with the limb 22 by means of a plate 32 (seen most clearly in Fig. 4), fixed on bush 29 by means of a nut **29*a***.

The other end of this spring is anchored as hereinafter to be described, so that the spring maintains the screw 30 in contact with the cam-face.

The limb 21 of the bi-metal element carries an insulated operating winding 33 (Figs. 1, 2 and 7). One end **33*a* of this winding is connected with the bi-metal strip, whilst the other end is connected by a conductor 34, with a strip metal terminal member 35 secured, such as by a rivet 36 (Figs. 1 and 7), to a surface 35*a* (Fig. 9) of the block 1 below (in Fig. 2) the surface on which the plate 5** is mounted.

The plate 5 is formed with an out-turned terminal member 37.

Figure 6:
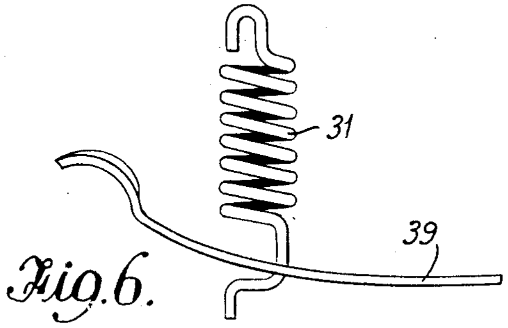

The cam is formed with a central boss 38 (Figs. 1, 2 and 9) which bears against the under-side of the plate 5 and is held in contact therewith by a leaf spring 39 (Figs. 1 and 9), secured, such as by a rivet 40, to the block 1, the free end of this leaf spring bearing against the rear surface 41 of the cam. This leaf spring is shown separately in Figs. 5 and 6. The spring 31 is anchored in a hole **39*a*** in the leaf spring, as seen in Fig. 6, which shows the set of the spring, i.e. its form before assembly.

The leaf spring is formed at its free end with a curved portion **39*b* (Fig. 9) adapted to enter notches 39*c* and 39*d*** (Figs. 9 and 10) in the outer face of the cam.

The moving contact 11 is provided with an adjustable back stop comprising a grub screw 42 (Figs. 2 and 8) received in the screw-threaded bore of the rivet 6.

The device may be enclosed by an insulating cover 43 through slots in which the terminals **19*a*, 35 and 37 extend. The terminal 37 may be provided with a lug 44** which after assembly of the device is turned over so as to secure the cover in place.

Figure 15:
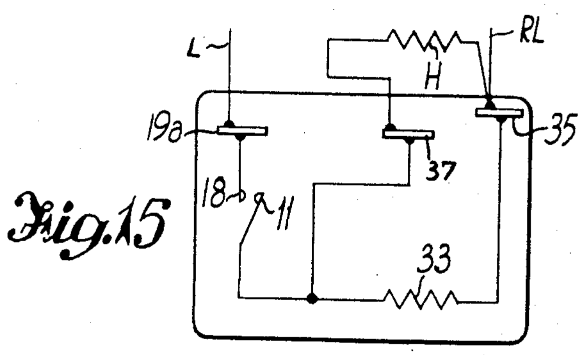

Fig. 15 is an electrical circuit diagram of the arrangement of Figs. 1, 2 and 9, inclusive, showing the terminals **19*a* and 35 connected respectively with the line and neutral conductors of a supply system and showing a hot-plate element H or other load connected between the terminals 37 and 35**.

The bi-metal strip is arranged to deflect toward the base block with increase of temperature.

Fig. 10 is a development view showing the profile of the face cam 4 from which it will be seen that this profile has a minimum height at *a*, increasing comparatively steeply to a point *b* and then progressively at a uniform or non-uniform lesser slope as may be desired to point *c* followed by a hump *d* from which the profile returns by a steep portion to the point *a*. In the illustrated "off" position of the regulator the cam is positioned so that the point *a* is aligned with the end of the screw 30. In this position the end **39*b* of the spring leaf 39 enters the notch 39*d*** providing positive indication of the "off" position.

When the screw 30 is in contact with the point *a* of the cam, being held against the same by the spring 31, the limb 21 of the bi-metal strip urges the lever 14 toward the base plate against the force of the switch spring 10 and holds the contact 11 out of engagement with the contact 18 so that the load, such as the hot plate H (Fig. 15) remains de-energised. Assuming the shaft 2 to be adjusted by means of this operating knob (not shown), by movement in the clockwise direction as viewed from the forward end of said shaft, the cam moves to the right-hand in Fig. 10 so that the screw 30 will be moved away from the base block by an amount proportional to the displacement of the shaft. At some point after the point *b* of the cam has passed the screw 30 the movement of the latter is sufficient to cause such an angular displacement of the bi-metal strip, hinging on the flexible strip 26, as to allow the switch contacts to close. The load is therefore energised and at the same time the operating winding 33 is energised and the limb 21 of the bi-metal strip is therefore heated. After a short time the deflection of said limb toward the base block will move the lever 17 downwardly again and the contacts will be re-opened, thereby to de-energise the hot plate and the operating winding 33. When the bi-metal strip is sufficiently cooled and the latter moves away from the base block the switch contacts will be re-closed and the above described cycle of operation will be maintained. Under the conditions just above described, namely with the point *b* of the cam moved past the screw 30, the displacement of the limb 22 of the bi-metal strip away from the base block is relatively small, so that a small increase of temperature of the limb 21 is sufficient to re-open the switch. On the other hand, since the temperature to which the limb 21 has been raised is correspondingly small the rate of cooling thereof will be relatively low and therefore the time for which the contacts remain open will be large compared with the time for which the contacts are closed, thereby providing a low mean input to the hot plate.

With greater displacement of the cam, such that the screw 30 is in contact with any point on the cam profile between the points *b* and *c*, the displacement of the limb 22 away from the base block is proportionately greater so that the limb 21 must be raised by a correspondingly greater temperature before opening the switch. The contacts therefore remain closed for longer time periods, whilst since the temperature is greater and the rate of cooling of the bi-metal strip therefore greater, the time periods for which the contacts are open will not be increased in the same proportion. Accordingly the mean input to the hot plate is increased in accordance with the displacement of the cam. At the point *c* for example the percentage time of energisation of the hot plate may for example be 60%. Further displacement of the cam comparatively rapidly brings the point *d* of the cam into alignment with the screw 30, and under these conditions the displacement of the limb 22 is such that continuous energisation of the winding 33 will not raise the temperature of the limb 21 sufficiently to re-open the contacts. The hot plate is therefore continuously energised. The notch 39*c* is aligned with the portion 39*b* of the leaf spring 39 in this position of the cam, providing positive indication of the "full-on" or "maximum" position. It will be observed that the slope of the cam between the points *d* and *a* enables the hot plate to be switched on for continuous energisation, or to be switched off from the continuously energised position, by a small movement of the shaft 2.

The manner of operation of the regulator is similar to that described in British Letters Patent No. 517,538, to the complete specification of which attention is hereby directed for a full description.

In the device according to the present invention, since the two limbs 21 and 22 of the bi-metal strip are formed by cutting or stamping from the same sheet of bi-metal material said limbs will not be subject to inaccuracies due to variations in thickness and flexility of the material as may be involved where two separate bi-metal elements are employed. Whereas the limb 21 is heated by the winding 33, as above described, the limb 22 receives negligible heat from said winding and provides ambient temperature compensation, the distance of the free ends of the two limbs from the base plate 5 differing from one another by an amount depending on the difference in temperature of the two limbs. The position of the free end of the lever 14, for a given position of the cam, depends upon the difference in temperature of the two bi-metal limbs and the contact 11 is therefore operated as hereinbefore described to provide energy regulation adjustable by the position of the shaft 2. Ambient temperature variations, however, will effect both limbs 21 and 22 equally and will thereby not substantially modify the operation of the regulator. The bi-metal element is free to pivot about an axis adjacent its flange 24 as permitted by the flexible strip 26 and will, therefore, assume a position depending upon the position of the cam and the temperature conditions of the two limbs. The mounting of the bi-metal element by means of the flexible strip 26 avoids friction and provides improved consistency of operation. It will be noted also that the combination of the operating and compensating elements in a single element enables a reduction in size and cost resulting from the reduction both in number of parts and in labour charges.

The screw 30 provides for adjustment of the zero of the regulator, whilst the screws 9 and 42 provide for adjustment of the over-centre operation of the switch and the contact gap in the open position.

In some applications of energy regulators, such as for controlling hot plates, it is desirable to provide for additional switch operations. The device of Figs. 1 and 2 may readily be adapted for such requirements by providing the additional switches on a side face of the base block 1 and arranging for their operation by the cylindrical surface of the cam 4 which is suitably modified for the purpose.

Figs. 12 to 14 inclusive show a modified construction of a regulator generally as previously herein described, wherein an additional switch is provided. The additional switch comprises a spring contact blade 60 (Figs. 11, 13 and 14) secured, such as by a rivet 61, to the terminal member 35. A contact 62 is carried at the free end of the blade 60 and is adapted to engage with a fixed contact 63 which is mounted on a conducting bracket 64 secured by means of a rivet 65 to the base block 1. A fourth terminal member 66 is mounted on the base block 1 by means of a rivet 67 and the bracket 64 is connected with this terminal member by means of a conducting strap 68 held by the rivets 65 and 67. The blade 60 is formed with a longitudinal slit at 69 (Fig. 13) and the two portions of the strip lying respectively on the two sides of this slit are crimped in opposite directions as appears at 70 and 71 in Fig. 11. The portion 70 adjacent the base block 1 being crimped toward the cam 4. The crimp 70 is thus aligned with a part of the peripheral edge of the cam 4, this edge having the form shown in dotted lines 72 in Fig. 11, being mainly circular, but with a hump 73. The cam is illustrated in Fig. 11 in the "full-on" or "maximum" position of the energy regulator. With the cam 4 in the "off" position the hump 73 engages the crimp 70 thereby to open the contacts 62 and 63. The contacts 62 and 63 will be closed in all other positions of the cam.

Figure 16:
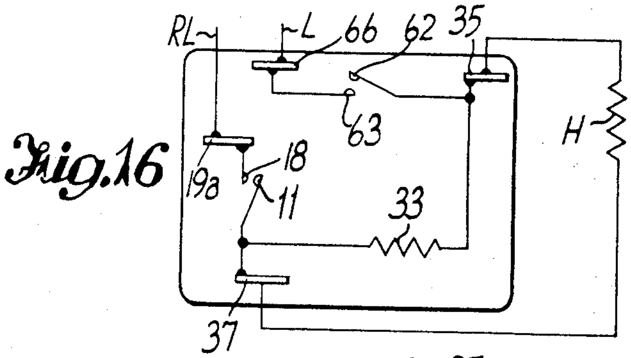

Fig. 16 shows the arrangement just above described with the terminals 19*a* and 66 connected to the two supply lines L and RL, and the hot plate H connected with the terminals 35 and 37. With this arrangement in the "off" position of the shaft 2 the contacts 11 and 18 are open as in the previously described arrangement to disconnect the terminal 37 from the terminal 19*a* on one side of the supply, whilst at the same time in Fig. 16, the contacts 62 and 63 are opened to disconnect the terminal 35 and the other side of the hot plate from the terminal 66 and from the other supply line, whereby to provide double-pole isolation of the load in the "off" position of the regulator.

The regulator illustrated in Figs. 12 to 14 inclusive, whilst being generally similar in construction to that of the preceding figures, includes modifications of certain details, as will now be described.

The spring 31 of Figs. 1–9 inclusive, is replaced by a blade spring 74 of hair-pin form, one limb 75 of which is secured as by a rivet 76 (Figs. 12 and 13) to the switch blade 5 and another limb 77 of which engages with a lug 78 (Figs. 11, 12 and 13), comprising a double cranked blade secured to the limb 22 of the bi-metal strip by means of the bush 29 and nut 29*a*. The hair-pin spring is assembled with an initial set such that the limb 77 engages with the lug 78 to urge the bi-metal strip toward the base plate 1 and thereby hold the screw 30 in engagement with the cam 4. Together with the spring 31 the leaf spring 39 and notches 39*a* and 39*b* of the cam are omitted in the construction of Figs. 11 to 14. In order to provide positive indication of the "off" and "full-on" positions, the arrangement now to be described is employed. The cam 4 has moulded therein a pair of metal strips 79 and 80, as can be seen from Fig. 12, and also from the fragmentary views of Figs. 18 and 19; Fig. 18 is a plan view taken on the line XVIII—XVIII of Fig. 12, whilst Fig. 19 is a fragmentary cross sectional elevation taken on the line IXX—IXX of Fig. 12.

An annular spring washer 81 is located between the cam 4 and the base block 1, and is provided with notches 82 and 83 receiving the ends of the strips 79 and 80, the lower ends of which are shouldered as seen most clearly in Fig. 19. The washer is provided with tangential slits at 84 and 85 (Fig. 18), and are oppositely crimped on opposite sides of each of these slits, as shown at 86 and 87. A metal plate 88 is mounted on the inner surface of the base block 1, being held in place by the bush 3 and its nut 3*a*. The bush is prevented from rotating either by being given a non-circular peripheral edge engaging with corresponding projections on the base block 1, or by interlocking surfaces between the bore in said plate and on the bush 3, which latter is self prevented from rotating by interlocking engagement with a locating member 89 (Figs. 12 and 14), received in a channel 90 in the outer face of the base block 1.

The plate 88 is provided with a pair of diametrically opposite openings 91 and 92 (Figs. 12 and 19), in such positions as to receive the crimps 86 when the cam 4 is in the "off" position. Further notches may be provided so as to receive said crimps when the cam occupies the "full-on" position.

The switch contacts 62 and 63 may be employed for providing other switching operations, for example where it is desired to provide, in addition to the control of a hot plate by the energy regulator contacts 11 and 18, connection of two sections of the hot plate between different ranges of positions and the shaft 2. As will be clear to those skilled in the art the cam surface 72 (Fig. 11) can be suitably formed according to the ranges of angular movement of the cam 4 during which the contacts 62 and 63 are required to be respectively opened and closed.

Figure 17:
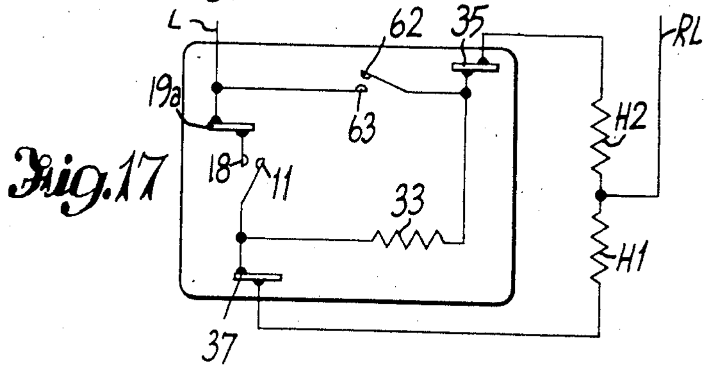

As shown, for example by Fig. 17, a hot plate element comprising two sections H1 and H2 has these sections connected in series between the terminals 37 and 35, the terminal 19*a* is connected as in Fig. 15 with one supply conductor L, whilst the other supply conductor RL is connected between the tapping of the two hot plate sections. The regulator employed in Fig. 17 is of the same general construction as that described with reference to Figs. 11 to 14 inclusive, except that the terminal 66 is omitted and the conducting bracket 64 is connected with the terminal 19*a*. For this purpose the connecting strap 68 is suitably located so as to be held at one end by the rivet 20 securing the member 19 in place. The cam surface 72 of Fig. 11, is, in this example, given a radius larger than that illustrated so as to hold the contacts 62 and 63 open and the hump 73 is replaced by a notch which is aligned with the crimp 70 in the "full-on" position. In all except the "full-on" position the circuit will proceed from the supply line L to the hot plate section H1 and thence to the return conductor RL, and the energisation of this hot plate element will be controlled by the contacts 11 and 18 in accordance with the setting of the shaft 2. During this operation the operating winding 33 is connected with the return conductor RL by means of the hot plate element H2, but since the latter has a resistance which is very low compared with that of the winding 33 it will have no substantial effect on the operation.

With the shaft 2 in the "full-on" position the notch referred to in the cam surface 72, being aligned with the crimp 70, allows closure of the contacts 62 and 63 so that the hot plate element H2 is connected in parallel with the element H1; the latter element is continuously energised since the contacts 11 and 18 are continuously energised.

What we claim is:

1. A temperature compensated thermally operable electric switch device comprising a switch, an adjustable abutment, a piece of bimetal material having independently deflectable parts connected by a connecting part from the same side of which said deflectable parts extend to heat deflectable points connected respectively with the abutment and the switch, and mounting means locating the bimetal at the connecting part for movement of the deflectable parts about a common axis whereby to provide a switch operating force in accordance with the differential deflection of said parts and both the temperature compensating and operating elements of the switch formed by the common piece of bimetal material.

2. A temperature compensated thermally operable electric switch device as claimed in claim 1, in which the switch has a moving contact carried by a blade spring including a portion thereof acting as a compression member biasing said moving contact, the connection of the heat deflectable point of one of the deflectable parts of the bimetal element with the switch being between said deflectable part and said blade spring.

3. A temperature compensated thermally operable electric switch device as claimed in claim 2, in which a pivoted lever provides the mechanical connection of the one deflectable part of the bimetal element with the blade spring, the free end of which is movable by said deflectable part and the pivoted end of which is connected with the blade spring to cause pivotal movement of the latter about the same axis as said lever.

4. A temperature compensated thermally operable electric switch device as claimed in claim 1, including in addition to the bimetal operated switch additional switch contacts engageable and disengageable by movement of means for adjusting the adjustable abutment of the bimetal element.

5. A temperature compensated thermally operable electric switch device as claimed in claim 4, in which the adjustable abutment comprises a face cam and in which one of the additional switch contacts is mounted on a spring member engaging with the periphery of the member forming the face cam, said periphery being formed to cause flexing of said spring member and thereby to move said contact relative to a fixed contact.

6. A temperature compensated thermally operable electric switch device comprising a switch, an adjustable abutment, a generally U-shaped piece of bimetal material having independently deflectable limbs extending in the same general plane as one another to heat deflectable points connected respectively with the abutment and the switch, and mounting means locating the bimetal at the bight of the U shape for movement of the deflectable limbs about a common axis whereby to provide a switch operating force in accordance with the differential deflection of said parts and both the temperature compensating and operating elements of the switch formed by the common piece of bimetal material.

7. A temperature compensated thermally operable electric switch device comprising a switch, an adjustable abutment, a piece of bimetal material having independently deflectable parts connected by a connecting part from the same side of which said deflectable parts extend to heat deflectable points connected respectively with the abutment and the switch, and a flexible mounting member locating the bimetal at the connecting part for allowing a hinging action of the bimetal as a whole about a common axis and deflection of the parts differentially according to the temperature thereof whereby to provide a switch operating force in accordance with the differential deflection of said parts and both the temperature compensating and operating elements of the switch formed by the common piece of bimetal material.

8. A temperature compensated thermally operable electric energy regulator comprising a switch, an adjustable abutment, a piece of bimetal material having independently deflectable parts connected by a connecting part from the same side of which said deflectable parts extend to heat deflectable points connected respectively with the abutment and the switch, one of said deflectable parts being arranged for electric heating of said part and mounting means locating the bimetal at the connecting part for movement of the deflectable parts about a common axis whereby to provide a switch operating force in accordance with the differential deflection of said parts and both the temperature compensating and operating elements of the switch formed by the common piece of bimetal material.

9. A temperature compensated thermally operable electric switch device as claimed in claim 8 in which the mounting means for the bimetal element is a flexible member allowing a hinging action of the bimetal element as a whole with the deflection of the first and second parts of said element differentially in accordance with the temperatures thereof.

10. A temperature compensated thermally operable electric switch device as claimed in claim 8, in which the switch has a moving contact carried by a blade spring including a portion thereof acting as a compression member biasing the moving contact of the switch, the connection between the heat deflectable point of said deflectable part of the bimetal element and the switch being between said part and said blade spring.

11. A temperature compensated thermally operable electric switch device as claimed in claim 10 in which the mechanical connection of said part of the bimetal element with the blade spring comprises a pivoted lever, the free end of which is movable by said part and the pivoted end of which is connected with the blade spring to cause pivotal movement of the latter about the same axis as said lever.

12. A temperature compensated thermally operable electric switch device as claimed in claim 8 including in addition to the bimetal operated switch additional switch contacts engageable and disengageable by movement of the means for adjusting the adjustable abutment of the bimetal element.

13. A temperature compensated thermally operable electric energy regulator comprising a switch, cam adjustable by rotation to determine the setting of the regulator, a piece of bimetal having independently deflectable parts connected by a connecting part from the same side of which said deflectable parts extend to heat deflectable points connected respectively with the rotatable cam and the switch, one of said deflectable parts being arranged for electric heating of said part and mounting means locating the bimetal at the connecting part for movement of the deflectable parts about a common axis whereby to provide a switch operating force in accordance with the differential deflection of said parts and both the temperature compensating and operating elements of the switch formed by the common piece of bimetal material.

14. A temperature compensated thermally operable electric energy regulator comprising a base structure, a shaft journalled in the base structure, a face cam carried by the shaft, a cam-follower, a piece of bimetal material in a plane perpendicular to the axis of the shaft and having independently deflectable parts connected by a connecting part from the same side of which said deflectable parts extend to the free ends of the parts, one of which ends is connected by the cam-follower with the cam, and one of which deflectable parts is arranged for electric heating of said part, a snap-action switch mounted in said base structure for movement of a moving contact member thereof substantially in a plane perpendicular to said first plane and the free end of the other deflectable part of the bimetal being connected with the moving contact of the switch, and mounting means locating the bimetal at the connecting part for movement of the deflectable parts about a common axis whereby to provide a switch operating force in accordance with the differential deflection of said parts and both the temperature compensating and operating elements of the switch formed by the common piece of bimetal material.

15. A temperature compensated thermally operable electric energy regulator as claimed in claim 14 in which the mounting means for the bimetal element is a flexible member allowing a hinging action of the bimetal element as a whole with the deflection of the first and second parts of said element differentially in accordance with the temperatures thereof.

16. A temperature compensated thermally operable electric switch device as claimed in claim 15, in which an additional switch contact is mounted on a spring member engaging with the periphery of the member forming the face cam, said periphery being formed to cause flexing of said spring member and thereby move said contact relatively to a fixed contact.

17. A temperature compensated thermally operable electric energy regulator comprising an insulating member, a shaft journalled in the base structure, a face cam carried by the shaft, a cam-follower, a piece of bimetal material having independently deflectable parts connected by a connecting part from the same side of which said deflectable parts extend to the free ends of the parts, one of which ends is connected by the cam-follower with the cam and the bimetal being in a plane perpendicular to the axis of the shaft, a heater associated with one of said deflectable parts, a snap-action switch mounted in said base structure for movement of a moving contact thereof substantially in a plane perpendicular to said first plane, and the free end of the other deflectable part of the bimetal being connected with the moving contact of the switch, and mounting means locating the bimetal at the connecting part by means of the insulating base member for movement of the deflectable parts about a common axis whereby to provide a switch operating force in accordance with the differential deflection of said parts and both the temperature compensating and operating elements of the switch formed by the common piece of bimetal material, the switch parts being located between the base insulating member and the bimetal element and the cam being mounted to that side of the switch parts remote from the bimetal element with the operating shaft on the side of the insulating member remote from the switch parts and the bimetal element.

18. A temperature compensated thermally operable electric energy regulator as claimed in claim 17 in which the mounting means for the bimetal element is a flexible member allowing a hinging action of the bimetal element as a whole with the deflection of the first and second parts of said element differentially in accordance with the temperatures thereof.

19. A temperature compensated thermally operable electric energy regulator as claimed in claim 17 in which an additional switch contact is mounted on a spring member engaging with the periphery of the member forming the face cam, said periphery being formed to cause flexing of said spring member and thereby move said contact relatively to a fixed contact.

20. A temperature compensated thermally operable electric energy regulator comprising an insulating base block, portions of which extend from the rear thereof to form a recess, a shaft journalled in the base block, a face cam carried by the shaft in said recess, a cam-follower, a piece of bimetal material having independently deflectable parts connected by a connecting part from the same side of which said deflectable parts extend to the free ends of the parts, one of which is connected by the cam-follower with the cam and the bimetal being in a plane perpendicular to the axis of the shaft, a heater associated with one of said deflectable parts, a snap-action switch mounted by the extending parts at the rear of the block for movement of a moving contact thereof substantially in a plane perpendicular to said first plane, and the free end of the other deflectable part of the bimetal being connected with the moving contact of the switch, and mounting means locating the bimetal at the connecting part by means of the extending portion from the rear of the block for movement of the deflectable parts about a common axis whereby to provide a switch operating force in accordance with the differential deflection of said parts and both the temperature compensating and operating elements of the switch formed by the common piece of bimetal material, the switch parts being located between the base insulating block and the bimetal and the cam being mounted to that side of the switch parts remote from the bimetal with the operating shaft on the side of the insulating block remote from the switch parts and the bimetal element.

21. A temperature compensated thermally operable switch assembly comprising a spring biased switch operating lever, a bimetallic element comprising spaced substantially side by side similar limbs rigidly joined at one end by a bridge, an adjustable cam surfaced abutment, a cam-follower rigid with one of said limbs spring biased into contact with said cam surface, electrical heating means on the other of said limbs, said other limb being operably connected to said switch operating lever, and means at said bridge mounting said bimetallic element for bodily rocking movement as said abutment is adjusted.

22. In the temperature compensated thermally operable switch defined in claim 21, said bimetallic element being an integral substantially U-shaped strip of bimetallic material.

References Cited in the file of this patent

UNITED STATES PATENTS

| | | |
|---|---|---|
| 2,189,996 | Riche | Feb. 13, 1940 |
| 2,267,463 | Hood et al. | Dec. 23, 1941 |
| 2,284,383 | Elmer | May 26, 1942 |
| 2,578,947 | Rothwell et al. | Dec. 18, 1951 |
| 2,744,178 | Eckberg | May 1, 1956 |